(12) United States Patent
Staab et al.

(10) Patent No.: US 10,406,857 B2
(45) Date of Patent: Sep. 10, 2019

(54) ALIGNMENT SYSTEM AND METHOD FOR WHEEL ASSEMBLY

(71) Applicant: ABB Schweiz AG, Baden (CH)

(72) Inventors: Harald J. Staab, Bavaria (DE);
Jeremy Newkirk, Brookfield, IL (US);
Gregory F. Rossano, Enfield, CT (US)

(73) Assignee: ABB Schweiz AG, Baden (CH)

( * ) Notice: Subject to any disclaimer, the term of this patent is extended or adjusted under 35 U.S.C. 154(b) by 244 days.

(21) Appl. No.: 15/250,412

(22) Filed: Aug. 29, 2016

(65) Prior Publication Data
US 2017/0057283 A1    Mar. 2, 2017

Related U.S. Application Data

(60) Provisional application No. 62/211,731, filed on Aug. 29, 2015.

(51) Int. Cl.
*B60B 29/00* (2006.01)
*G01B 11/275* (2006.01)
(Continued)

(52) U.S. Cl.
CPC .......... *B60B 29/001* (2013.01); *G01B 11/275* (2013.01); *G01M 17/013* (2013.01);
(Continued)

(58) Field of Classification Search
CPC ... B60B 29/00; B60B 29/001; B60B 2340/50; B60B 2340/52; B23P 19/10; B23P 2700/50; Y10T 29/4978; Y10T 29/49895; Y10T 29/49902; Y10T 29/53978; Y10T 29/53448; Y10T 29/49769; G01B 11/27; G01B 11/275; G01B 2210/10; G01B 2210/14; G01B 2210/283; G01B 2210/286; G01B 2210/30; G01M 17/013; B25H 7/04–045
See application file for complete search history.

(56) References Cited

U.S. PATENT DOCUMENTS 2,208,883 A * 7/1940 Hall ...................... B60B 29/001
254/131
2,292,968 A    8/1942 Peters
(Continued)

FOREIGN PATENT DOCUMENTS

FR    2942196 A1 *  8/2010 ............. B23P 19/10
WO    2015003204 A1   1/2015

OTHER PUBLICATIONS

International Search Report and Written Opinion, PCT/US16/49294, dated Nov. 7, 2016, 9 pages.

*Primary Examiner* — Matthew P Travers
(74) *Attorney, Agent, or Firm* — Taft Stettinius & Hollister LLP; J. Bruce Schelkopf

(57) ABSTRACT

An apparatus and method for aligning a rim of a wheel assembly to a wheel hub. The apparatus can include a wheel handler device that is structured to securely engage the wheel assembly. The apparatus can include one or more light emitting devices that project one or more light spots on the face of the wheel hub. The position of one or more light spots relative to another light spot(s) and/or to a reference feature on the face of the hub can provide an indication of the location, orientation, and/or alignment of at least the rim relative to the wheel hub.

20 Claims, 12 Drawing Sheets

(51) Int. Cl.
  *G01M 17/013* (2006.01)
  *B23P 19/10* (2006.01)
(52) U.S. Cl.
  CPC .............. *B23P 19/10* (2013.01); *B60B 29/008* (2013.01); *B60B 2340/52* (2013.01); *G01B 2210/14* (2013.01); *G01B 2210/24* (2013.01); *G01B 2210/283* (2013.01)

(56) References Cited

U.S. PATENT DOCUMENTS

| | | | |
|---|---|---|---|
| 2,708,712 A * | 5/1955 | Jamieson | B60B 29/001 29/273 |
| 4,185,917 A | 1/1980 | Alsina | |
| 6,167,607 B1 * | 1/2001 | Pryor | A01B 69/008 29/407.04 |
| 6,684,516 B2 | 2/2004 | Voeller et al. | |
| 7,715,024 B2 | 5/2010 | Sotgiu | |
| 2011/0173829 A1 * | 7/2011 | Pettersson | B25H 1/0021 33/503 |
| 2014/0138502 A1 * | 5/2014 | Hall | B60C 25/125 248/205.1 |
| 2015/0151576 A1 * | 6/2015 | Grengs | B60B 29/001 414/428 |

* cited by examiner

ALIGNMENT SYSTEM AND METHOD FOR WHEEL ASSEMBLY

BACKGROUND

Embodiments of the present disclosure generally relate to an alignment system. More particularly, but not exclusively, embodiments of the present disclosure relate to a method and system for relatively accurately aligning, and subsequently securing, a wheel assembly to a wheel hub.

Physical characteristics, such as, for example, size and weight, associated with at least certain types of removable components of an assembly may prevent, or otherwise interfere with, the ability to manually handle that component. Such physical characteristics may also hinder, or otherwise preclude, the ability to accurately position, during assembly, the removable component relative to another, mating component(s). For example, wheel assemblies for at least certain types of vehicles, such as relatively large construction equipment and mining vehicles, among others, may have a weight and/or size that generally prevent those wheel assemblies from being manually maneuvered to a position in which the wheel assembly can be operably attached or assembled to a wheel hub of the vehicle. Further, the size of such components may interfere with the ability of an operator who is assembling the components to readily recognize the relative positions of those components. Thus, the assembly of such relatively large components may require the assistance of an additional person who is to be positioned in dangerously close proximity to those components during assembly.

The nature of the mechanical connections used to secure relatively large components may further complicate the assembly of those components. For example, wheel assemblies for large mining and construction vehicles may be secured to wheel hubs using a relatively large number of lugs or bolts, such as, for example, seventy bolts. Such mechanical connections however may necessitate the need for precise positioning of a rim of the wheel assembly relative to the wheel hub so that each of the holes of the rim and/or wheel hub is properly aligned to receive insertion of a lug or bolt. Thus, the tolerances in the location/orientation of the rim relative to the wheel hub may be relatively small, such as, for example, less than 2 millimeters (mm) along each of three axes of displacement, and less than one degree in three rotational or angular orientations, namely, roll, pitch, and/or yaw.

BRIEF SUMMARY

An aspect of the present disclosure is an apparatus for aligning a rim of a wheel assembly to a wheel hub. The apparatus can include a wheel handler device that is structured to securely engage the wheel assembly. The apparatus can include a centrally located light emitting device that is oriented to emit a beam of light that is collinear with a central radial axis of the rim of the wheel assembly that is securely engaged by the wheel handler device. The apparatus also can include at least one angled light emitting device that is oriented to emit a beam of light that intersects the beam of light of the centrally located light emitting device at a face of the wheel hub when the central radial axis of the rim is generally aligned with a longitudinal axis of the wheel hub.

Another aspect of the present disclosure is an apparatus for aligning a rim of a wheel assembly to a wheel hub that can include a wheel handler device that is structured to securely engage the wheel assembly. The apparatus also can include a first light emitting device that is structured to project a first beam of light onto a face of the wheel hub as a first light spot, and a second light emitting device that is structured to project a second beam of light onto the face of the wheel hub as a second light spot. Additionally, the second light emitting device can be adapted to emit the second beam of light in a direction that is generally parallel to the direction the first beam of light. The first and second light emitting devices can be further adapted to project the first and second light spots onto a reference location on the face of the wheel hub when a central radial axis of the rim of the wheel assembly that is securely engaged by the wheel handler device is generally aligned with a longitudinal axis of the wheel hub.

Another aspect of the present disclosure is a method for aligning a rim of a wheel assembly to a wheel hub that includes securing the wheel assembly to a wheel handler device of a wheel handler assembly and may emit one or more of beams of light from one or more light emitting devices of the wheel handler assembly toward a face of the wheel hub. The method further can include aligning one or more light spots projected onto the face of the wheel hub by the emitted one or more beams of light with a reference location, and securing, after alignment of the one or more light spots with the reference location, the wheel assembly to the wheel hub.

BRIEF DESCRIPTION OF THE DRAWINGS

The description herein makes reference to the accompanying figures wherein like reference numerals refer to like parts throughout the several views.

Figure 1:
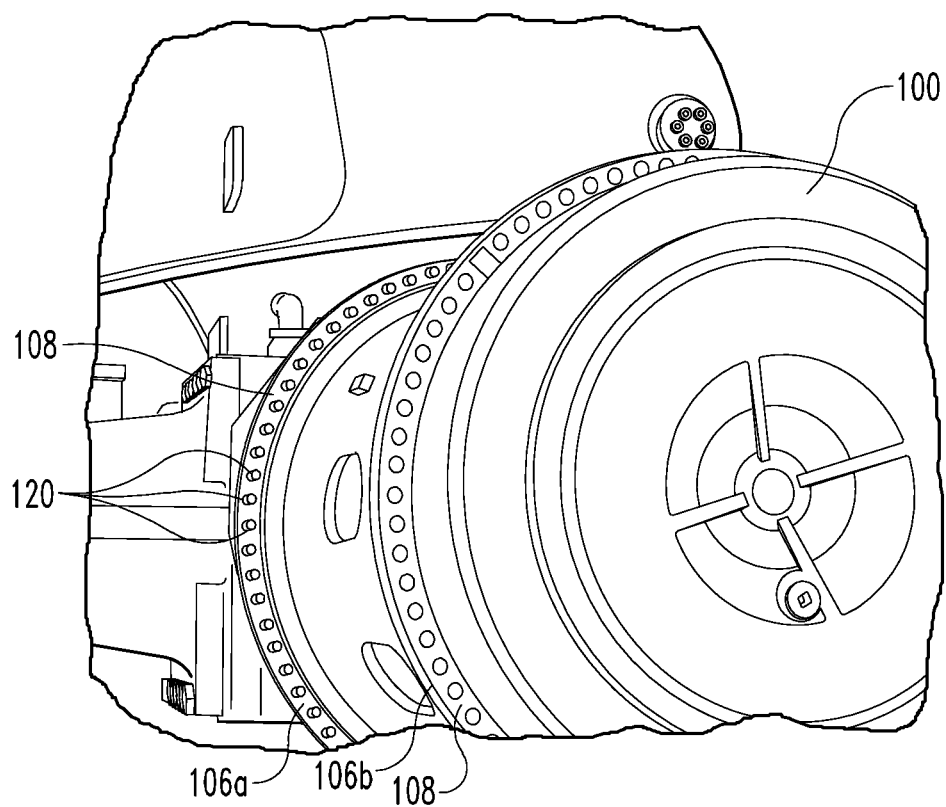
FIG. 1 illustrates a partial front side perspective view of an exemplary rear wheel hub of a vehicle in which the rear wheel hub includes inner and outer assembly plate.

The foregoing summary, as well as the following detailed description of certain embodiments of the present disclosure, will be better understood when read in conjunction with the appended drawings. For the purpose of illustrating embodiments of the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "inner," "outer," "top," "front," "rear," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof. It should be further noted that when terms such as beam, light beam, beam of light, light spot or similar description is used herein that definition should not limiting or narrowly construed. By way of example and not limitation a beam, light beam, beam of light or light spot may be a single finely focused beam from a laser or similar type of apparatus. In other forms a beam, light beam, beam of light or light spot may include a plurality of individual rays of light. In yet other forms a beam, light beam, beam of light or light spot may include a pattern or a variable shaped configuration. In yet other forms the term beam, light beam, beam of light or light spot may be diffused or less focused than certain narrowly focused light sources.

Figure 2:
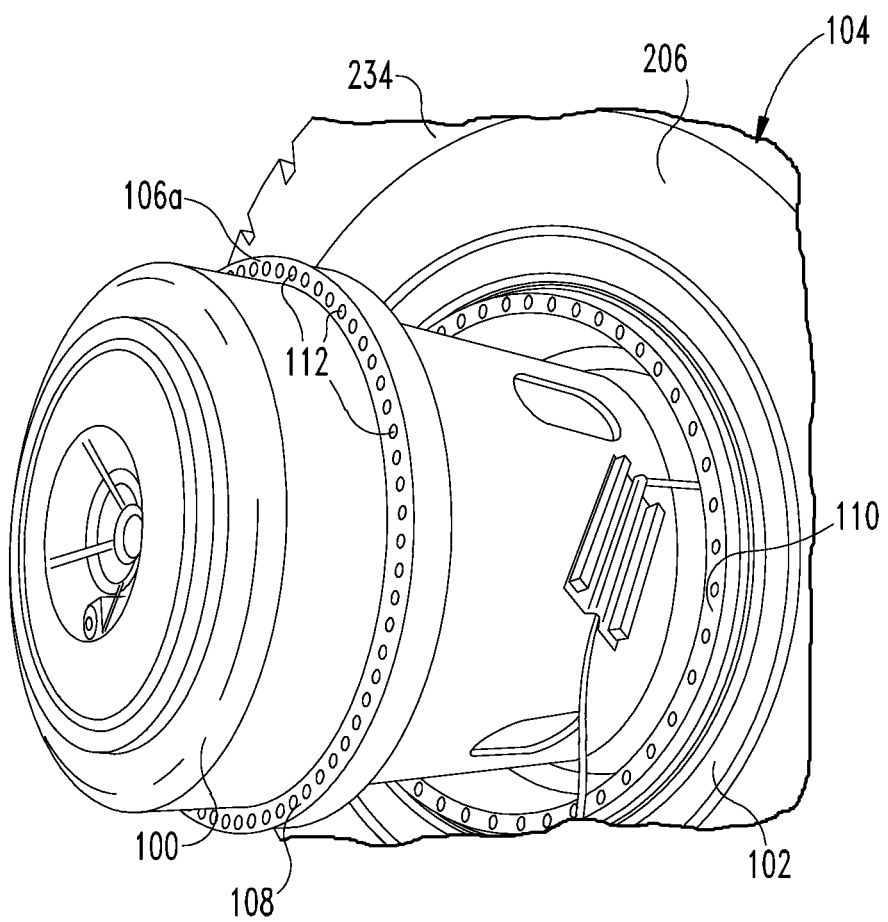
FIG. 2 illustrates a side perspective view of the rear wheel hub shown in FIG. 1 in which a wheel assembly is coupled to the inner assembly plate.

FIGS. 1 and 2 illustrate perspective views of an exemplary rear wheel hub 100 of a vehicle. The illustrated wheel hub 100 may be a portion of, or otherwise coupled to, an axle of the vehicle, which may be, for example, a mining or heavy construction vehicle, among other types of vehicles. For example, the wheel hub 100 shown in FIG. 1 may be a distal end of a rear axle of a mining truck. Additionally, the illustrated wheel hub 100 includes inner and outer assembly plates 106a, 106b that are each structured for attachment to a rim 102 of a wheel assembly 104. According to the exemplary wheel hub 100 depicted in FIGS. 1 and 2, the inner and/or outer assembly plates 106a, 106b may extend radially outwardly about at least a portion of an outer circumference of the wheel hub 100. Additionally, the inner assembly plate 106a may have a size, such as, for example, an outer diameter, that is larger than a corresponding size of the outer assembly plate 106b. Such differences in sizes may allow a wheel assembly 104 that is adapted to be coupled or assembled to the inner assembly plate 106b to pass over the outer assembly plate 106b so that a wheel assembly 104 may be axially displaced to a position in which the wheel assembly 104 may be coupled or assembled to the inner assembly plate 106a.

Figure 3:
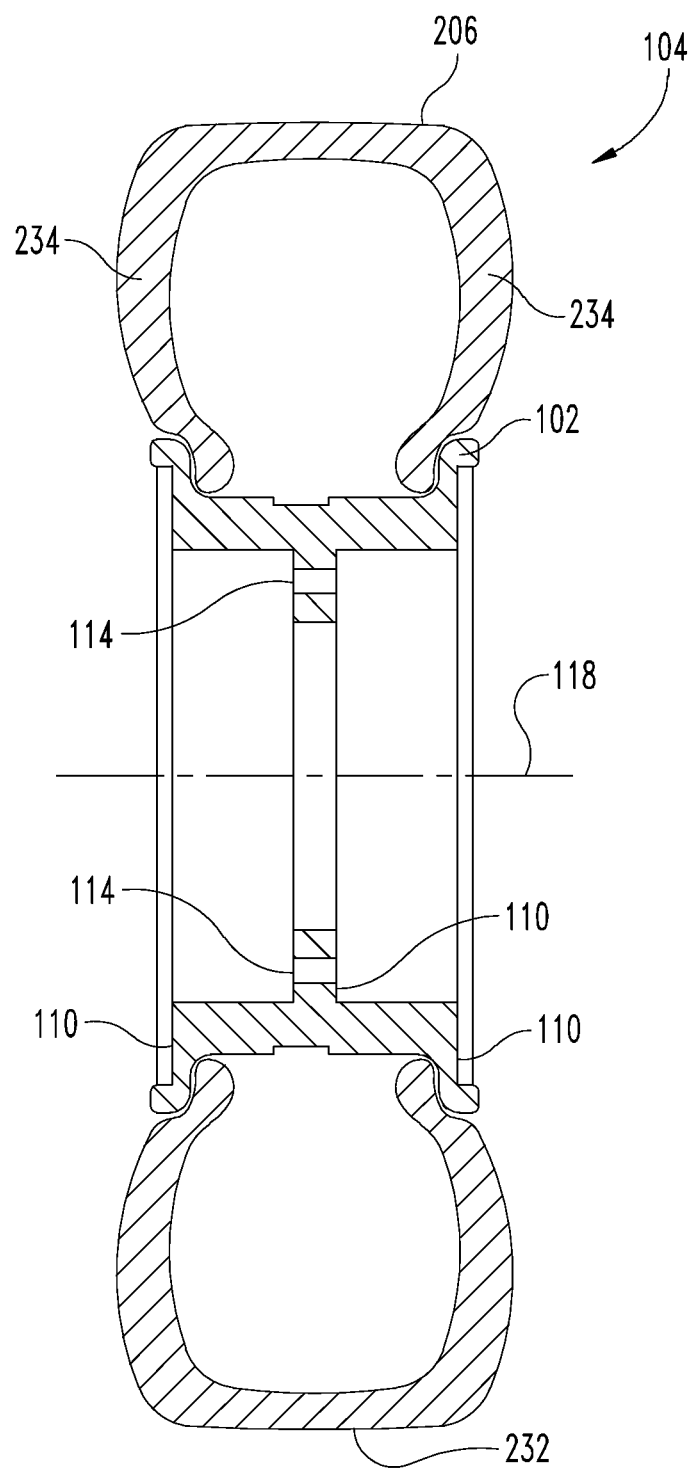
FIG. 3 illustrates a cross sectional view of a schematic of an exemplary wheel assembly.

According to certain applications, the inner and outer assembly plates 106a, 106b may each include a front wall 108 and an opposing rear wall (not shown), the front wall 108 being adapted to abut against, or otherwise be adjacent to, an opposing sidewall 110 of the rim 102 of the associated wheel assembly 104. The inner and outer assembly plates 106a, 106b may also be structured to be coupled or assembled to the wheel assembly 104 in similar or dissimilar manners. For example, as shown in FIG. 1, the outer assembly plate 106b may include a plurality of apertures 112 that extend through the outer assembly plate 106b, and more specifically, extend from the front wall 108 to the rear wall of the outer assembly plate 106b. At least some of the apertures 112 may be sized to receive insertion of a bolt that is used to securely couple a rim 102 of a wheel assembly 104 to the outer assembly plate 106b. As shown in FIG. 3, according to certain designs, the rim 102 of the wheel assembly 104' may include a plurality of holes 114 that are configured to also receive insertion of a bolt that extends into corresponding apertures 112 in the outer assembly plate 106b. Alternatively, according to other designs, the bolts may be lugs that are operably affixed to, or otherwise part of, the rim 102 of the wheel assembly 104, 104'. The assembly of the wheel assembly 104, 104' to the outer assembly plate 106b may further include one or more mechanical fasteners, such as, for example, nuts, that threadingly engage the bolts to secure the rim 102, and thus the wheel assembly 104, 104', to at least the outer assembly plate 106b.

Figure 7:
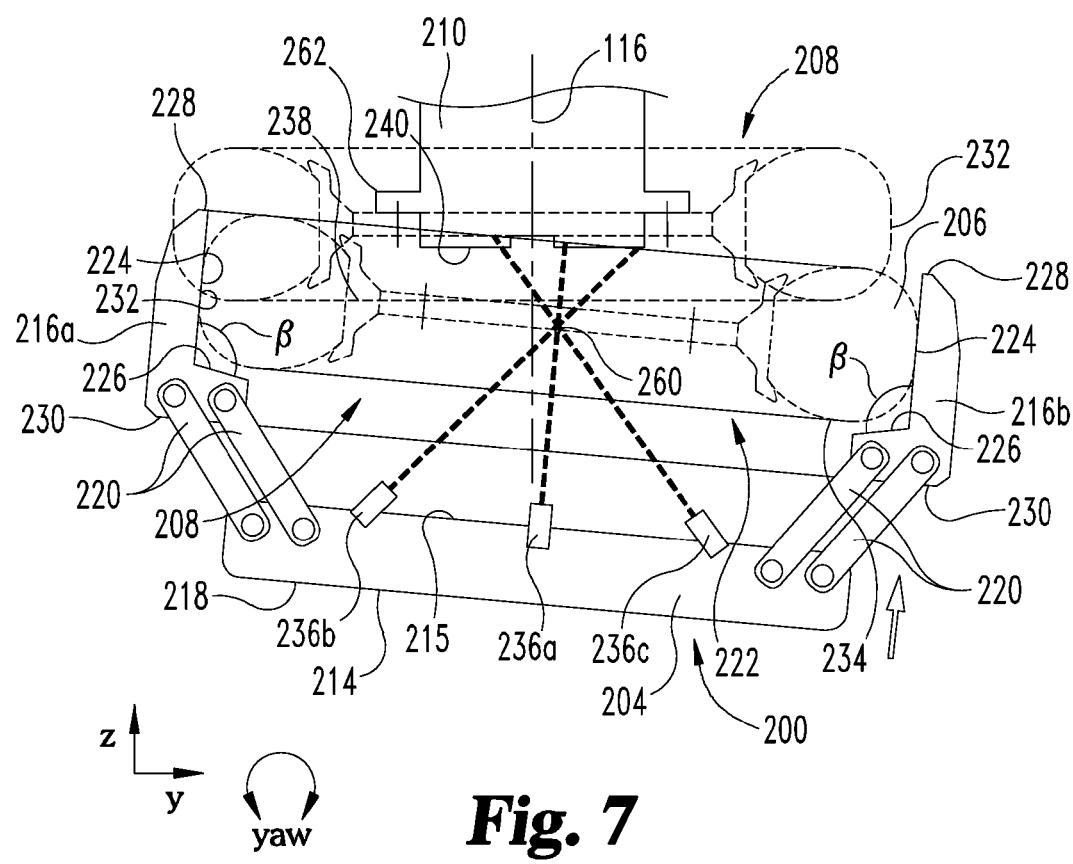
FIG. 7 illustrates a wheel handler device that is securely engaged with a wheel assembly that is shown in two different stages of assembly to a wheel hub.

In the depicted design, the apertures 112 of the outer assembly plate 106b may have a size, such as, for example, an inner diameter, that is larger than a mating size, such as an outer diameter, of the bolts. Such differences in sizes may improve the ease at which the bolts may be received in the apertures 112 of the outer assembly plate 106b. However, such differences in sizes may provide opportunities for variances in the relative position at which the rim 102, and thus the wheel assembly 104, 104', is secured to the outer assembly plate 106b. Moreover, such differences in sizes may contribute to the wheel assembly 104, 104' being assembled to the outer assembly plate 106b at a location in which a central longitudinal axis 116 of the wheel hub 100 (as shown in FIG. 7) is misaligned with a central radial axis 118 of the rim 102 (as shown in FIG. 3). Alternatively, the relatively large number of apertures 112 that are to be aligned with corresponding holes 114 in the rim 102 and/or lugs or bolts may allow for little, if any, variance in the location at which the rim 102 may be secured to the outer assembly plate 106b. Further, according to certain embodiments, the apertures 112 of the depicted outer assembly plate 106b may include an internal thread that is configured for a threaded connection with at least a portion of the bolt that may extend through the aperture 112. Thus, such designs may necessitate that the central longitudinal axis 116 of the wheel hub 100 be generally aligned with the central radial axis 118 of the wheel assembly 104 before the rim 102 can be secured to the outer assembly plate 106b.

Unlike the outer assembly plate 106*b*, rather than having a plurality of apertures 112, the inner assembly plate 106*a* depicted in of FIG. 1 includes a plurality of bolts or lugs 120 that extend outwardly in a circular pattern along the front wall 108 of the inner assembly plate 106*a*. As indicated by FIG. 3, according to such an design, the holes 114 of the rim 102 of the associated wheel assembly 104, 104' may be arranged along the rim 102 in a pattern such that the holes 114 are positioned to receive insertion of a bolt or lug 120. According to certain designs, the holes 114 of the rim 102 may have a size, such as, for example, an inner diameter, that is larger than a mating size, such as an outer diameter, of the bolts or lugs 120 of the inner assembly plate 106*a*. Such differences in sizes may improve the ease at which the bolts or lugs 120 may be received in the holes 114 of the rim 102. However, such size differences may also at least assist in facilitating the rim 102, and thus the wheel assembly 104, 104', being secured to the wheel hub 100 at position in which the central longitudinal axis 116 of the wheel hub 100 is misaligned with a central radial axis 118 of the rim 102. Alternatively, the relatively large number of bolts or lugs 120 and the corresponding holes 114 of the rim 102 may necessitate that the that the central longitudinal axis 116 of the wheel hub 100 be aligned with the central radial axis 118 of the rim 102 before the rim 102 may be secured to the inner assembly plate 106*a*.

Figure 4:
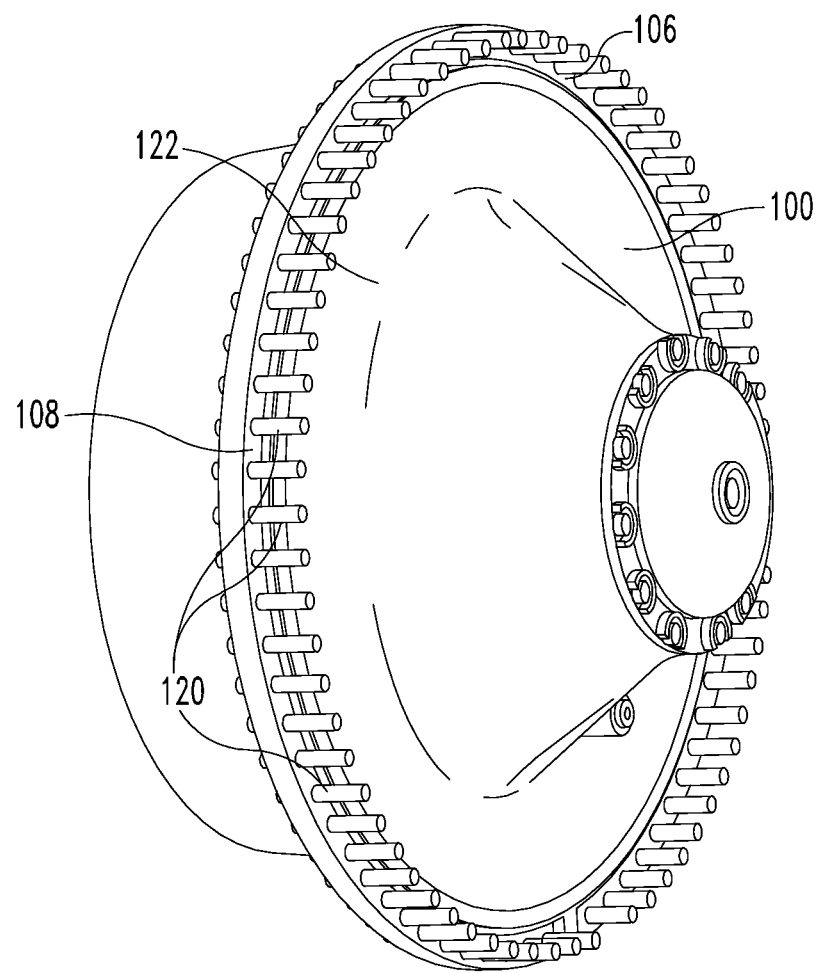
FIG. 4 illustrates a front side perspective view of an exemplary wheel hub of a vehicle having a plurality of studs that extend from an outer face of the wheel hub.
Figure 5:
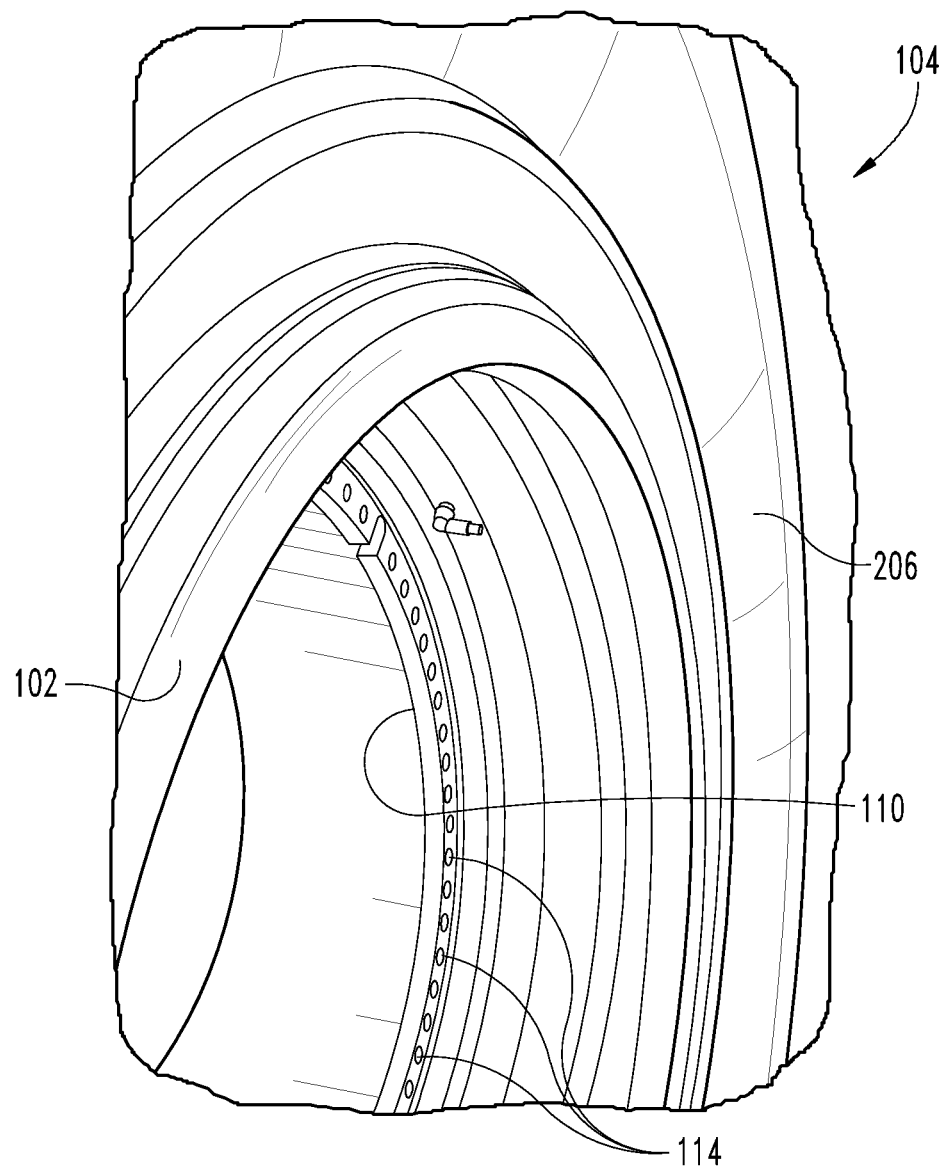
FIG. 5 illustrates an exemplary wheel assembly that is adapted for attachment to the wheel hub shown in FIG. 4.

While the above examples discusses the outer assembly plate 106*b* having a plurality of the apertures 112 and the inner assembly plate 106*a* having a plurality of bolts or lugs 120, according to other designs, the outer assembly plate 106*b* may have plurality of bolts or lugs 120 and/or the inner assembly plate 106*a* may include a plurality of the apertures 112. For example, FIG. 4 depicts a front wheel hub 100' of a mining truck in which a plurality of bolts or lugs 120 outwardly extend from an outer assembly plate 106*b* that is positioned along or adjacent to an outer wall 122 of the wheel hub 100'. Further, unlike the wheel hub 100 depicted in FIGS. 1 and 2, the wheel hub 100' depicted in FIG. 4 is adapted for assembly to a single wheel assembly 104", such as, for example, the wheel assembly 104" shown in FIG. 5. Accordingly, the wheel assembly 104" depicted in FIG. 5 includes a rim 102' having a plurality of holes 114 that are configured to receive the insertion of the bolts or lugs 120 of the outer assembly plate 106*b* during assembly of the wheel assembly 104" to the wheel hub 100'.

According to certain embodiments of the present disclosure, the wheel assembly 104, 104', 104" has a size or weight that generally precludes the wheel assembly 104, 104', 104" from being manually handled or maneuvered during assembly of the wheel assembly 104, 104', 104" to the wheel hub 100, 100'. For example, according to certain embodiments, the wheel hub 100, 100' may be structured for attachment to a rim 102, 102' of a wheel assembly 104, 104', 104" that has a tire or wheel diameter of approximately 4 feet to approximately 6.5 feet, and a wheel width of 1.5 feet to approximately 3 feet, among other diameters and widths. Such sizes, however, are provided for purposes of illustration, and the wheel hub 100, 100' may be structured for operable attachment to wheel assemblies having a variety of other sizes and/or weights. Additionally, although the embodiments discussed herein are described in connection with wheel assemblies and wheel hubs, embodiments of the present disclosure may be utilized with other types of machines, devices, and/or replaceable or removable components.

Figure 6A:
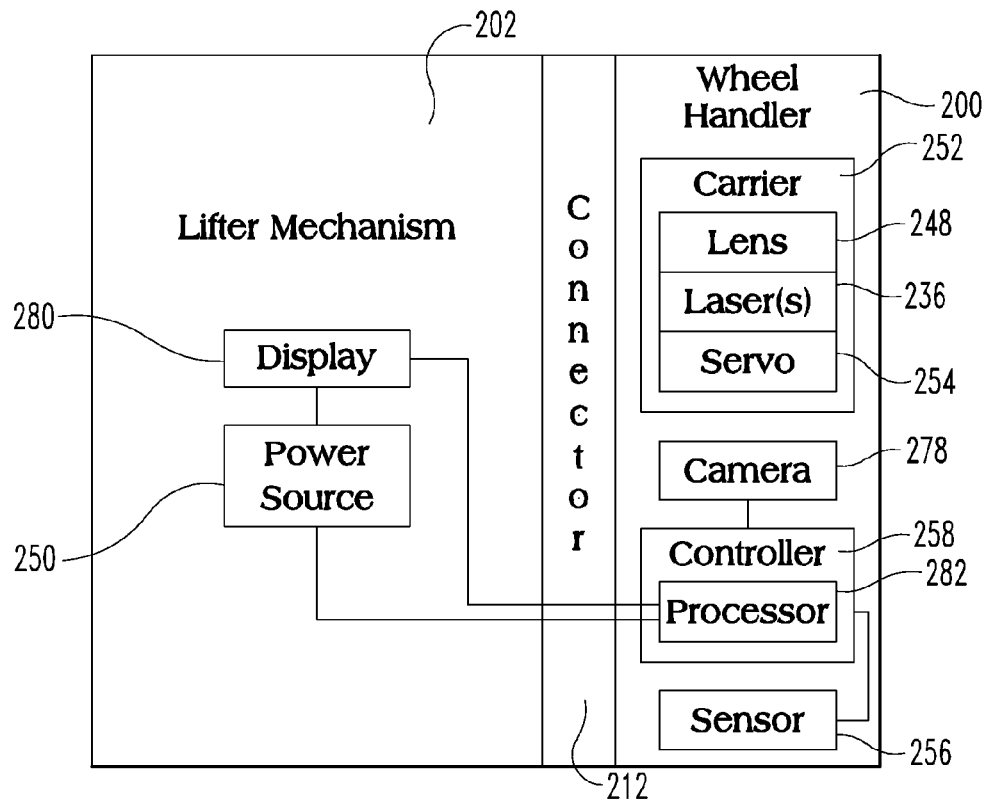
FIGS. 6A and 6B illustrate block diagrams of exemplary embodiments of a wheel handler assembly and a lifter mechanism.
Figure 6B:
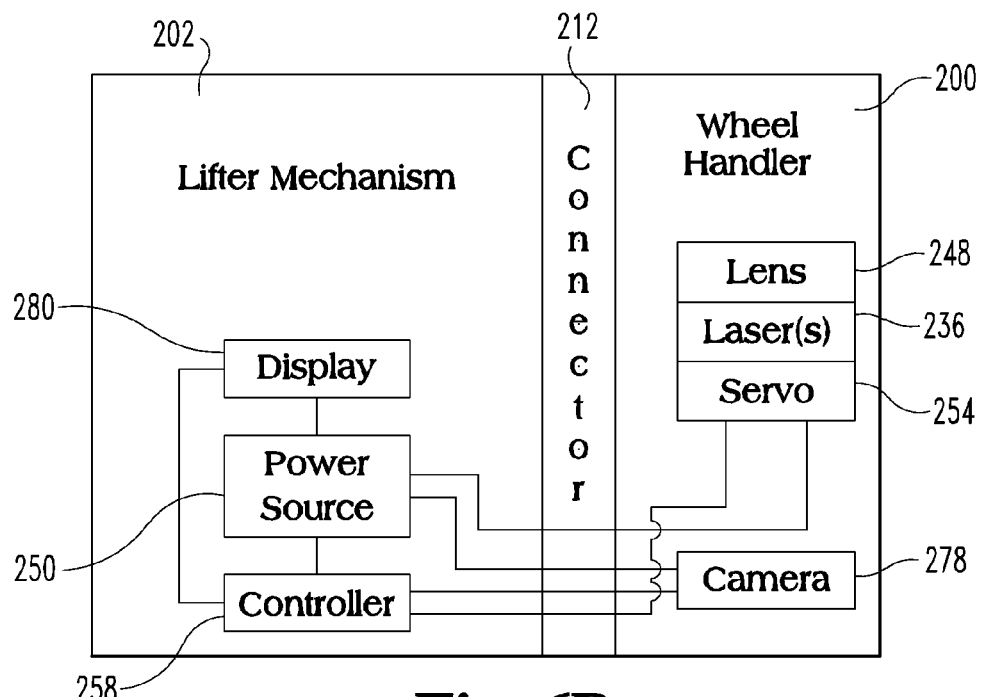

FIGS. 6A and 6B illustrate block diagrams of exemplary embodiments of a wheel handler assembly 200 and lifter mechanism 202. The wheel handler assembly 200 includes a wheel handler device 204, as shown for example in FIG. 7, that is structured to securely engage a tire or wheel 206 of a wheel assembly 208 at least during assembly of the wheel assembly 208 to, and/or removed from, a wheel hub 210. The wheel handler assembly 200 can further include a connector mechanism 212 that is adapted to facilitate the mounting or attachment of the wheel handler device 204 to the lifter mechanism 202. Further, the lifter mechanism 202 may be structured to at least vertically displace the position of the wheel handler device 204. Moreover, the connector mechanism 212 may be adapted to operably couple the wheel handler device 204 to a lifter mechanism 202 that may at least raise or lower the wheel handler device 204 to a vertical position in which the wheel handler device 204 may securely engage a wheel assembly 208, as well as to a position in which the wheel assembly 208 is positioned to be placed on, or otherwise received by, the wheel hub 210. The lifter mechanism 202 may be further adapted to displace at least the wheel handler device 204 and the engaged wheel assembly 208 in a variety of other directions, and/or adjust the angular orientation of the engaged wheel assembly 208 at least relative to the wheel hub 210.

A variety of different types equipment, devices, and vehicles may be used as the lifter mechanism 202, including, for example, cranes, hoists, and lifter vehicles, among other types of devices and vehicles. For example, according to certain embodiments, the lifter mechanism may be a lift truck, fork lift, wheel loader, or a front end loader. Further, the connector mechanism 212 may be structured for permanent or removable engagement of the wheel handler device 204 with the lifter mechanism 202. Further, according to certain embodiments, the connector mechanism 212 may extend from or through a wall of the wheel handler device 204, such as, from or through at least a portion of an outer wall 214 of the wheel handler device 204. Additionally, the connector mechanism 212 may be adapted to be coupled to the lifter mechanism 202 by more or more mechanical fasters, including, for example, bolts, pins, or locking plates, among other mechanical connections. Alternatively, the connector mechanism 212 may be welded to the lifter mechanism 202. According to other embodiments, the connector mechanism 212 may be part of, or adapted to receive, the arms or forks of the lifting device, or have brackets that otherwise engage lifted components of the lifter mechanism 202, such as, for example, engage the carriage or carrier of a forklift.

FIG. 7 illustrates a wheel handler device 204 securely engaged with a wheel assembly 208 that is shown in two different stages of assembly to a wheel hub 210. In the depicted embodiment, the wheel handler device 204 includes an opposing pair of retention arms 216*a*, 216*b* and a cross bar 218. The retention arms 216*a*, 216*b* may each be pivotally connected to opposing ends of the cross bar 218, such as, for example, by one or more hinges or linkages 220. According to certain embodiments, the retention arms 216*a*, 216*b* are adapted to be engaged by, or part of, the lifter mechanism 202 in a manner in which the lifter mechanism 202 may be used to displace at least one retention arm 216*a*, 216*b* relative to the other retention arm 216*a*, 216*b* so as to adjust the size of a space or area 222 between the retention arms 216*a*, 216*b*. For example, according to certain embodiments, the wheel handler device 204 may be coupled to a fork lift that includes a hydraulically activated fork positioner that is configured to move the forks toward, or away from each other. According to such an embodiment, the displacement of one or more of the forks may increase or decrease the size of the space or area 222 between the retention arms 216a, 216b. Moreover, such displacement of the forks may cause the retention arms 216a, 216b to be pivotally displaced relative to the cross bar 218 between a first, open position and a second, closed position, the size of the space or area 222 between the retention arms 216a, 216b being larger when retention arms 216a, 216b are in the first, open position than when the retention arms 216a, 216b are in the second, closed position. Thus, the retention arms 216a, 216b may be in the first, open position when a wheel assembly 208 is to be received in, or removed from, the space or area 222 between the retention arms 216a, 216b. Further, according to the illustrated embodiment, with a wheel assembly 208 positioned in the space or area 222 between the retention arms 216a, 216b, the retention arms 216a, 216b may be pivotally displaced from the first, open position to the second, closed position. With the retention arms 216a, 216b in the second, closed position, the retention arms 216a, 216b may provide a compressive or clamping force against at least a portion of the wheel assembly 208, such as against a portion of the tire or wheel 206, that securely retains the wheel assembly 208 in engagement with the wheel handler device 204. With the wheel assembly 208 securely engaged by the wheel handler device 204, the position and/or orientation of the wheel handler device 204 may be adjusted by operation of the lifter mechanism 202, thereby adjusting the position and/or orientation of the wheel assembly 208.

According to certain embodiments, the retention arms 216a, 216b may be structured to both exert a clamping or compressive force on a tire or wheel 206 to securely engage the wheel assembly 208, as well as prevent or minimize axial displacement of the securely engaged wheel assembly 208 toward the cross bar 218 at least as the wheel assembly 208 is being assembled to a wheel hub 210. For example, according to the embodiment depicted in FIG. 7, each retention arm 216a, 216b may include a first wall 224 and a second wall 226, the second wall 226 generally extending from the first wall 224. The first and second walls 224, 226 may generally define a least a portion of the space or area 222 between the retention arms 216a, 216b that receives placement of the wheel assembly 208.

As depicted in FIG. 7, the first wall 224 may extend from a distal end 228, and toward a proximal end 230, of the retention arm 216a, 216b, and is oriented to abut against an outer or tread wall 232 of the tire or wheel 206. Thus, the first walls 224 of the retention arms 216a, 216b may be generally facing or directed toward each other when the retention arms 216a, 216b are securely engaged with a tire or wheel 206 of the wheel assembly 208. The second wall 226 may be oriented to abut against at least a portion of a sidewall 234 of the tire or wheel 206 so as to provide a barrier that limits or prevents the wheel assembly 208 from being axially displaced toward the cross bar 218. According to certain embodiments, the second wall 226 may extend from the first wall 224 at an angle (β) that is around or greater than 90°.

As indicated by FIGS. 6A, 6B, and 7, the wheel handler assembly 200 may also include a plurality of light emitting devices 236, 236a-c. The light emitting devices 236, 236a-c may be oriented and/or aligned along a portion of the wheel handler device 204 in a manner that provides a visual indication of the position and/or orientation of the wheel handler device 204, and/or of the rim 238 of the wheel assembly 208 that is securely engaged by the wheel handler device 204, relative to a wheel hub 210. For example, as shown in at least FIGS. 8-12B, the light emitting devices 236a-c may each project a beam of light that appears on a face 240 of the wheel hub 210 as a light spot 242a-e, 244a-d. Thus, the appearance and/or locations of one more of the light spots 242a-e, 244a-d relative to at least one other light spot 242a-e, 244a-d, or to one or more reference features 246 on the wheel hub 210, may provide a visual indication of the distance between, and/or the relative alignment of, the rim 238 and the wheel hub 210, as discussed below.

A variety of different light emitting devices 236, 236a-c may be employed, including, for example, light emitting devices 236, 236a-c that emit, or may be adapted to emit, a generally focused or narrow beam of light, such as, for example, lasers or LED pointers, among other light emitting devices 236, 236a-c. Further, the light emitting devices 236, 236a-c may be structured or adapted, such as, for example, through the use of optical devices or a lens 248, to emit a beam of light that may be projected onto a surface of the wheel hub 210 as a relatively small light spot 242a-e, 244a-d. Further, such lenses 248 may be adapted to provide a particular, relatively well defined shape for the light spots 242a-e, 244a-d that are projected onto the face 240 of the wheel hub 210 at least when the rim 238 attains a particular alignment with and/or axial position relative to the wheel hub 210. For example, as shown by at least FIGS. 8 and 9A, according to certain embodiments, the light emitted from the light emitting devices 236, 236a-c may each appear, when seen at least individually on the wheel hub 210 as a light spot 242a-e that is circular or T-shaped, or which appears as a straight or curved line, among other shapes and configurations that may assist in the visual detection of the alignment (or misalignment) and/or the distance between the rim 238 and the wheel hub 210. Further, different light emitting devices 236, 236a-c may emit light beams at a wavelength, or project a light spot 242a-e, 244d having a shape, that are different than the wavelength or light spots 242a-e that are associated with other light emitted devices 236, 236a-c. For example, according to certain embodiments, the light emitted by the centrally located light emitting device 236a may be projected at a different wavelength, and/or project a light spot 242a on the face 240 of the wheel hub 210 having a different shape, so as to enhance the ease at which that particular light spot 242a may be identified as being associated with the centrally located light emitting device 236a.

The light emitting devices 236, 236a-c may receive power from a variety of different power sources 250, such as, for example, from an electrical power or battery source that is operably coupled to the wheel handler device 204, the lifter mechanism 202, and/or is part of the light emitting device 236. Further, according to certain embodiments, the power source may be a separate or auxiliary power source of the lifter mechanism 202 or of the wheel handler device 204, or may be part of the electrical system of the lifter mechanism 202.

The light emitting devices 236, 236a-c may be positioned at a variety of locations along the wheel handler assembly 200 such that light emitted from the light emitting devices 236, 236a-c passes through openings in the wheel assembly 208 and/or around the wheel assembly 208. As shown in FIG. 7, and as reflected in at least FIGS. 8, 9A and 9B, according to certain embodiments, the light emitting devices 236, 236a-c may be positioned along, or extend from, an inner wall 215 of the cross bar 218. Further, at least one light emitting device 236a is position at a generally central location such that the light beam of that light emitting device 236a is generally collinear with the radial central axis 118 of the rim 238. According to other embodiments, the light emitting devices 236, 236a-c may be mounted to a carrier 252 (FIG. 6A) that is adjustable relative to the wheel handler device 204, such as, for example, adjustable along at least two axes (as indicated by "x" and "y" in FIG. 8). Such an embodiment may allow for the adjustment of at least the light emitting devices 236, 236a-c relative to a rim 238 of a wheel assembly 208 that is securely engaged by the wheel handler assembly 200 so that the position of at least the light beam of at least the centrally located light emitting device 236a can be adjusted, if needed, to be collinear with the central radial axis 118 of the rim 238.

According to certain embodiments, at least some of the light emitting device(s) 236a-c may be mounted or extend from the inner wall 215, the carrier 252, or among other portions of the wheel handler device 204. Further, the non-centrally positioned light emitting devices 236b-c may be oriented relative to the centrally located light emitting device 236a in a symmetrical or asymmetrical pattern or configuration about a centrally located light emitting device 236a. Additionally, according to certain embodiments, at least some of the additional light emitting devices 236b-c may be oriented at angles relative to the centrally located light emitting device 236a such that the beams emitted from those angled or side light emitting devices 236b-c are not parallel to the beam emitted from the centrally located light emitting device 236a. However, as discussed below, according to certain embodiments, the light emitting devices 236, 236a-c may be oriented such that the light beams emitted from at least two of the light emitting devices 26, 236a-c are generally parallel to each other and/or parallel to the central axis 118 of the rim 238.

Figure 8:
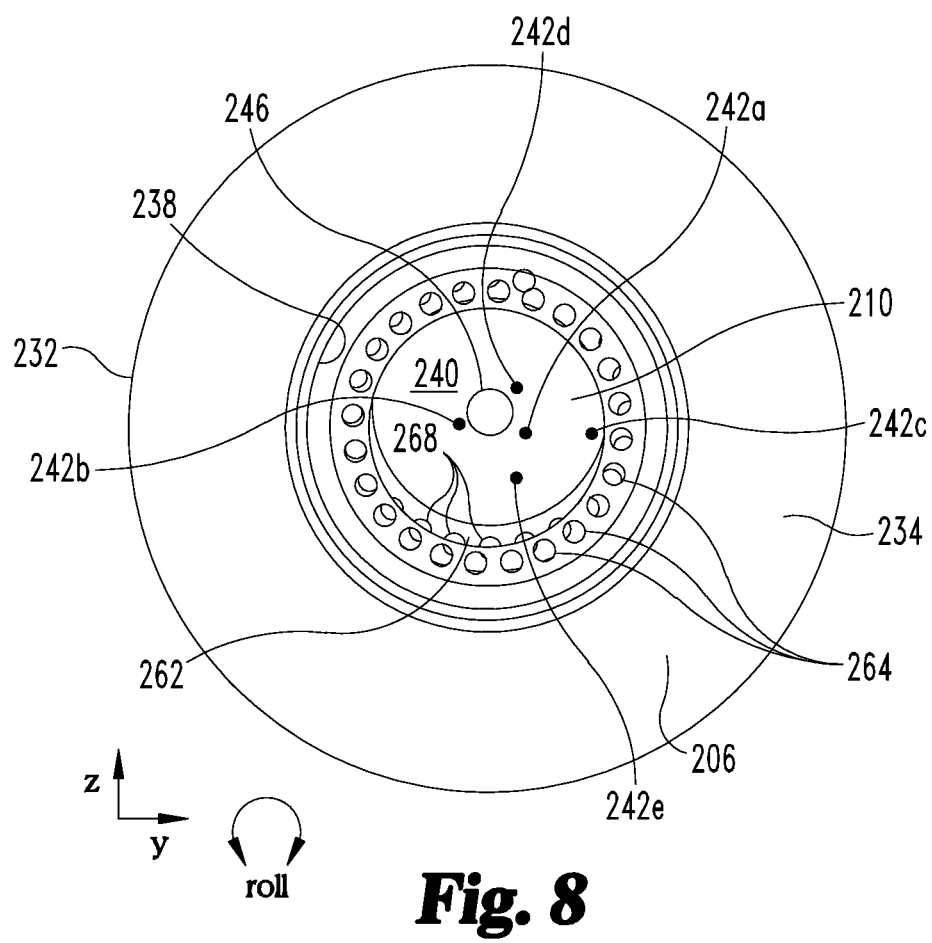
FIG. 8 illustrates an example of the assembly of a rim of a wheel assembly being positioned relative to a wheel hub using a wheel handler assembly that has five light emitting devices.

According to certain embodiments, the angular orientation of one or more of the light emitting devices 236, 236a-c may be adjusted manually or via operation of an adjustment device that is connected to the light emitting devices 236, 236a-c, such as, for example, via a servo motor 254 (FIGS. 6A and 6B). Further, such angular adjustment of the light emitting devices 236, 236a-c may occur manually or automatically as the distance between wheel handler assembly 200 and the wheel hub 210 changes. For example, according to certain embodiments, one or more distance or positional optical sensors 256 may detect or otherwise provide information indicative of the distance between the wheel handler assembly 200 and the wheel hub 210 to the operator of the lifter mechanism 202 and/or to a controller 258 of the wheel handler assembly 200. The distance sensor 256 may be a separate component of the wheel handler assembly 200, or may be part of one or more of the light emitting devices 236, 236a-c. Additionally, the distance senor 256 may be in parallel to the centrally located light emitting device 236a. Further, according to certain embodiments, the use of the centrally located light emitting device 236a to sense the distance between the wheel hub 210 and the rim 238, or inclusion of a distance sensor 256, may eliminate the need for the other, non-centrally located light emitting devices 236b-c. Additionally, positional information provided by any or all of the light emitting devices 236, 236a-c may be utilized to determine other positional or rotational information relating to the alignment or misalignment of the rim 238 to the wheel hub 210, including misalignment among other axes, such as the "x" and "y" axes (as indicated in FIG. 8), and/or relative differences in roll, pitch angle, and/or yaw.

The operator or the controller 258 may utilize such positional information to determine whether to adjust the angular orientation of one or more of the light emitting devices 236, 236a-c, and more specifically, whether to adjust the angular orientation of the non-centrally located light emitting devices 236b-c, which may at least assist in enhancing the accuracy of the alignment between the rim 238 and the wheel hub 210. Thus, for example, as the wheel handler assembly 200 moves into closer proximity to the wheel hub 210 (along the "z" axis, as indicated in FIG. 7) the angle of the non-centrally located light emitting devices 236b-c may be manually adjusted, or adjusted by operation of the servo motors 254, so that the angle at which the beams of light that are emitted from the non-centrally located light emitting devices 236b-c relative to an axis that is parallel to the central radial axis 118 of the rim 238 is increased, causing the intersection point 260 (FIG. 7) of the light beams to be closer to the wheel handler assembly 200. Conversely, as the wheel handler assembly 200 moves further away from the wheel hub 210 (along the "z" axis, as indicated in FIG. 7) the angle of the non-centrally located light emitting devices 236b-c may be manually adjusted or automatically adjusted by operation of the servo motors 254 so that the angle at which the beams of light that are emitted from the non-centrally located light emitting devices 236b-c is decreased, thereby causing the intersection point 260 of the light beams to be moved further away from the wheel handler assembly 200.

Activation of the light emitting devices 236, 236a-c may be controlled in a variety of manners. For example, according to certain embodiments, the controller 258 may be adapted to control the operation of the light emitting devices 236, 236a-c, including, for example, when light is, and is not, to be emitted from the light emitting devices 236, 236a-c. Alternatively, according to other embodiments, the wheel handler assembly 200 may include or be coupled to a power switch that is adapted to control the delivery of power from the power source 250, and thereby control when light is to be emitted from the light emitting devices 236, 236a-c.

According to certain embodiments, the plurality of light emitting devices 236, 236a-c may comprise five lasers. Additionally, according to certain embodiments, the plurality of light emitting devices 236, 236a-c may include a first pair of light emitting devices 236b-c, as shown for example in FIG. 7, that are each generally equally spaced by a first distance from, and on opposite sides of, the centrally located light emitting device 236a. Additionally, the plurality of light emitting devices 236a-c may also include a second pair of opposing light emitting devices that comprises a light emitting device positioned at a second distance above, and another light emitting device positioned at a second distance below, the centrally located light emitting device 236a. According to such an embodiment, during assembly, when the rim 238 is not aligned with the wheel hub 210, the centrally located light emitting device 236a may project a first light spot 242a on the face 240 of the wheel hub 210, the first pair of light emitting devices 236b-c may project second and third light spots 242b, 242c on opposing sides of the first spot 242a, and the second pair of light emitting devices may project fourth and fifth light spots 242d-e above and below the first spot 242a. Additionally, the first distance may generally be, or may not be, the same as the second distance. Accordingly, the angles at which light is emitted from the first pair of light emitting devices 236b-c may be the same or different than the angle at which the corresponding beams of light are emitted from the second pair of light emitting devices.

Figure 9A:
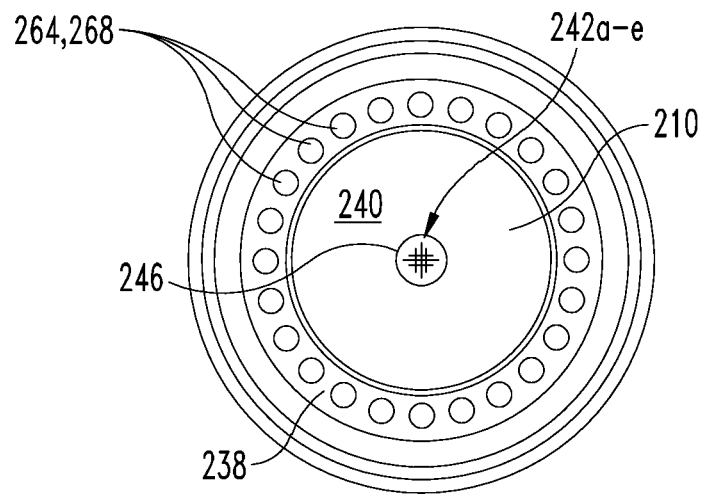
FIG. 9A illustrates an example of intersecting light spots from five light emitting devices providing a visual indication that a rim of a wheel assembly is generally aligned with a mating wheel hub.
Figure 9B:
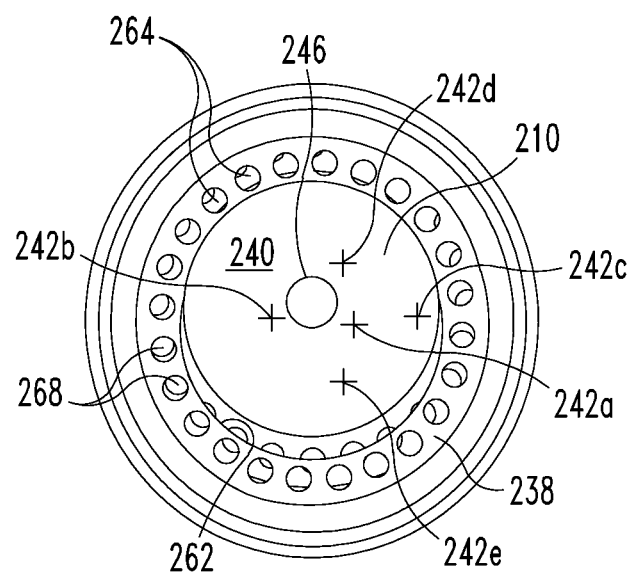
FIG. 9B illustrates an example of non-intersecting light spots from five light emitting devices providing a visual indication that a rim of a wheel assembly is misaligned with a mating wheel hub.
Figure 10A:
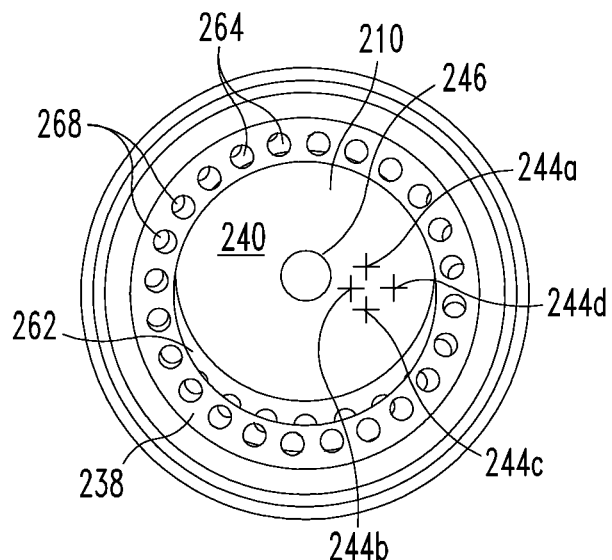
FIG. 10A illustrates an example of the position of light spots of four generally parallel light beams relative to a reference feature providing a visual indication that a rim of a wheel assembly is generally aligned with a mating wheel hub.
Figure 10B:
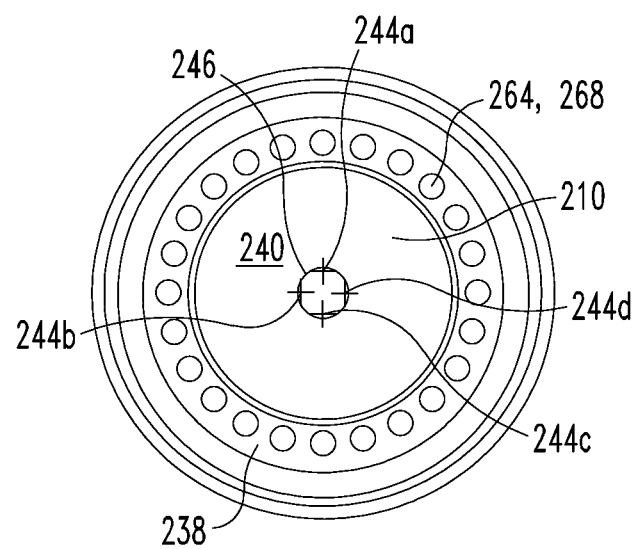
FIG. 10B illustrates an example of the position of light spots of four generally parallel light beams relative to a reference feature providing a visual indication that a rim of a wheel assembly is misaligned with a mating wheel hub.

Alternatively, as indicated by at least FIGS. 10A and 10B, according to other embodiments, the plurality of light emitting devices 236a-c may comprise two or more light emitting devices 236 that are configured to emit beams of light that are generally parallel to each other, or are otherwise non-intersecting. Optionally, such an embodiment may eliminate the use of a centrally located light emitting device 236*a*. Further, such parallel and/or non-intersecting beams of light are configured to be appear at a particular location on the face 240 of the wheel hub 210, such as, for example, align with one or more reference features 246 on the face 240 of the wheel hub 210 when the wheel handler device 204 is positioned such that the rim 238 and/or central radial axis 118 of the rim 238 are properly aligned with the wheel hub 210 and/or the central longitudinal axis 116 of the wheel hub 210. For example, according to the embodiment shown in FIGS. 10A and 10B, when the wheel handler device 204 and/or the rim 238 is/are generally properly aligned with the wheel hub 210, each of the light spots 244*a-d* may touch or otherwise be positioned along a reference feature 246 of the wheel hub 210, such as, for example, a reference feature 246 that provides a circular shape or pattern. Thus, while the rim 238 is being aligned with the wheel hub 210, the distance between the rim 238 and the wheel hub 210 and/or the corresponding assembly plate 262 may be related to the distance between the four light spots 244*a-d* in FIGS. 10A and 10B and the reference feature 246 on the face 240 of the wheel hub 210. Further, according to the embodiments depicted in FIGS. 8-9B, the distance between the four outer light spots 242*b-e* and the central light spot 242*a*, as projected on the face 240 of the wheel hub 210 may also provide an indication of the distance between the rim 238 and the wheel hub 210 and/or the corresponding assembly plate 262.

FIGS. 8, 9A, and 9B depict embodiments in which the plurality of light emitting devices 236, 236*a-c* comprises a centrally located light emitting device 236*a*, a first pair of light emitting devices 236*b-c* that are positioned at a first distance away from, and on opposing left and right sides of, the centrally located light emitting device 236*a*, and a second pair of light emitting devices that are positioned at a second distance above and below the centrally located light emitting device 236*a*. According to such an embodiment, the location at which the first light spot 242*a* from the light beam of the centrally located light emitting device 236*a* appears on the face 240 of the wheel hub 210 may indicate whether the position of the wheel handler device 204, and thus the position of the rim 238 of a wheel assembly 208 that is securely engaged by the wheel handler device 204, is to be adjusted (1) horizontally along a first axis (as indicated by the "y" axis in FIG. 8), (2) vertically along a second axis (as indicated by the "x" axis in FIG. 8), or (3) along a combination of the first and second axes. For example, in the examples provided in FIGS. 8 and 9B, the wheel handler device 204, and thus the rim 238, is to be both laterally displaced to the left (along first axis), as well as displaced upwardly in the vertical direction (along the second axis). According to certain embodiments, determination of whether the first light spot 242*a* is at or around a central location of the wheel hub 210 may be facilitated by the inclusion of a reference feature 246 on the wheel hub, such as, for example, the inclusion of a generally central circular shape, outline, protrusion, or indentation, among other design features. Additionally, as previously discussed, the size, shape, and/or definition of the light spots 242*a-e*, 244*a-d* that are emitted onto the face 240 of the wheel hub 210 and/or the position of the lights spots 242*a-e*, 244*a-d* may indicate that the wheel handler device 204, and thus the rim 238, are to be displaced along another, third axis (as indicated by the "z" axis in FIG. 7) so that the rim 238 is axially displaced into closer proximity to the mating assembly plate 262 of the wheel hub 210.

According to the embodiment illustrated in FIGS. 8-9B, differences in the distances between the second and third light spots 242*b*, 242*c* of the first pair of light emitting devices 236*b*, 236*c* and the first light spot 242*a* of the centrally located light emitting 236*a* may indicate that presence of a yaw angle between the rim 238 and the wheel hub 210 (as indicated by "yaw" in FIG. 7). Moreover, as previously discussed, in the illustrated embodiment, the first pair of light emitting devices 236*b-c* may correspond to the inclusion of a light emitting devices 236*b-c* on opposing right and left sides of the centrally located light emitting device 236*a*, as indicated by FIG. 7. According to such an embodiment, if the wheel handler device 204, and thus the rim 238, are tilted such that one of the right or left side of the rim 238 is titled, relative to at least the wheel hub 210, toward the wheel hub 210, and thus the other of the right and left sides of the rim 238 is titled, relative to at least the wheel hub 210, away from the wheel hub 210, the second and third light spots 242*b-c* may be separated by different distances from the first light spot 242*a*. Such differences in distances may therefore provide a visual indication to the operator of the lifter mechanism 202 to adjust a corresponding angular orientation of the wheel handler device 204, and thus adjust the corresponding angular orientation of the rim 238, to remove or reduce the yaw angle so that the second and third light spots 242*b-c* are separated from the first light spot 242*a* generally by the same distance and/or converge together at the first light spot 242*a*.

Similarly, according to the embodiment illustrated in FIGS. 8-9B, differences in distances between the fourth and fifth light spots 242*d*, 242*e* of the second pair of light emitting devices and the first light spot 242*a* of the centrally located light emitting 236*a* may indicate that presence of a pitch angle between the rim 238 and the wheel hub 210. Moreover, as previously discussed, in the illustrated embodiment, the second pair of light emitting devices may correspond to the inclusion of a light emitting device positioned above the centrally located light emitting device 236*a*, and another light emitting device positioned below the centrally located light emitting device 236*a*. According to such an embodiment, if the wheel handler device 204, and thus the rim 238, are tilted such that one of the upper or lower portion of the rim 238 is titled, relative to at least the wheel hub 210, toward the wheel hub 210, and thus the other of the upper and lower portion of the rim 238 is titled, relative to at least the wheel hub 210, away from the wheel hub 210, the fourth and fifth light spots 242*d-e* may be separated by different distances from the first light spot 242*a*. Such differences in distances may therefore provide a visual indication to the operator of the lifter mechanism 202 to adjust a corresponding angular orientation of the wheel handler device 204 and/or the rim 238 to remove or reduce the pitch angle so that the fourth and fifth light spots 242*d-e* are separated from the first light spot 242*a* by the same distance and/or generally converge together at the first light spot 242*a*.

As indicated by at least FIG. 8, in at least certain situations, a row orientation (as indicated by the "row" arrows in FIG. 8) may also need to be adjusted so that the holes 264, bolts, or lugs 120 of the rim 238 are aligned with the corresponding apertures 268, bolts, or lugs 120 of the assembly plate 262. Thus, according to certain embodiments, the lifter mechanism 202 may be adapted to facilitate or otherwise accommodate rotational displacement of at least the rim 238 to adjust the row orientation of the wheel handler device 204, and thus of the rim 238.

Figure 11A:
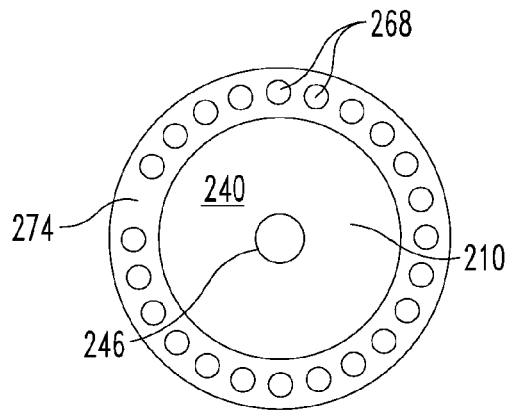
FIGS. 11A-11C illustrate the assembly of a rim to a wheel hub using a wheel handler assembly that includes a first ancillary light emitting device that provides a first orientation or position indicator for identifying the location of a reference item or location on an assembly plate.
Figure 11B:
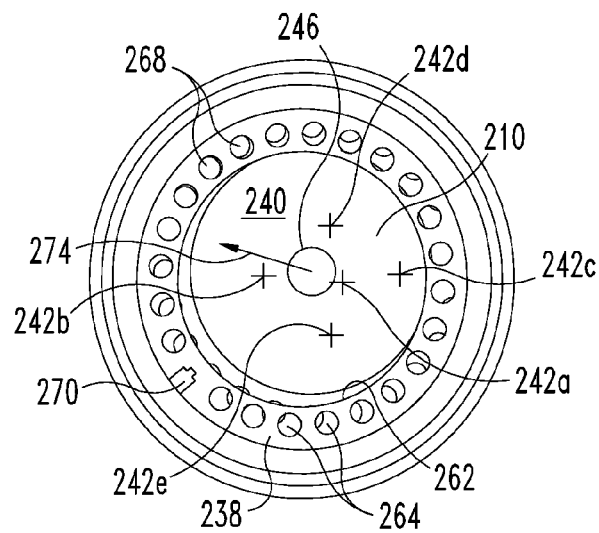
Figure 11C:
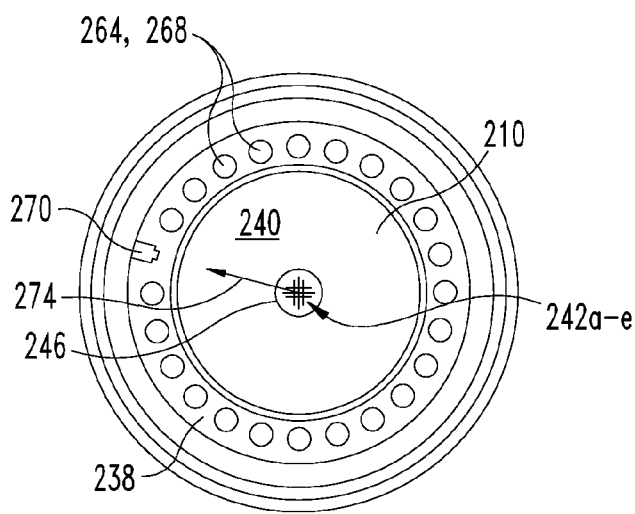

Referencing FIGS. 11A-11C, according to certain embodiments, adjustment in the row of the rim 238 may be utilized to accommodate the position of an air nozzle or stem 270 of the tire or wheel 206, such as a stem used for the inflation of the tire or wheel 206. Additionally such row adjustment may also align the rim 238 so that the air nozzle or stem 270 is positioned to be adjacent to a corresponding portion stem section 272 of the assembly plate 262 when the rim 238 is secured to the assembly plate 262. For example, FIG. 11A illustrates a wheel hub 210 having an assembly plate 262 having a stem section 272 that is adapted to be positioned adjacent to the stem 270 of the wheel assembly 208. According to certain embodiments, the stem section 272 may be a portion of the assembly plate 262 that does not have an aperture 268 or bolt or lug 120 that is otherwise used in securing the rim 238 to the assembly plate 262. Thus, the ability to adjust the row of at least the rim 238 may also allow for adjustments in the rotational orientation of at least the rim 238 so that the stem 270 may be positioned adjacent to the stem section 272 of the assembly plate 262.

As indicated by FIGS. 11B and 11C, when the rim 238 is in the process of being positioned to be secured to the wheel hub 210, the rim 238 may obscure the stem section 272 of the assembly plate 262, among other features of the assembly plate 262, from view of at least the operator of lifter mechanism 202. Thus, according to certain embodiments, the wheel handler assembly 200 may be adapted to project at least one first orientation or position indicator 274 that may provide an indication of the location of the stem section 272 of the assembly plate 262, among other features of the assembly plate 262, while the rim 238 is being positioned to be secured to the assembly plate 262. Further, according to certain embodiments, the first orientation or position indicator 274 may be provided by one or more first ancillary light emitting devices, such as, for example, an additional light emitting device 236, that may project light in the form of the first orientation or position indicator 274 on the face 240 of the wheel hub 210. For example, according to the illustrated embodiment, the first ancillary light emitting device may emit a light that projects an arrow shaped image on the wheel hub 210 that may point to a reference point of the assembly plate 262, such as the stem section 272. Further, the orientation of the first ancillary light emitting device may be selectively adjustable so as to accommodate, at least during the assembly of different wheel assemblies 208 to different wheel hubs 210, the various, different possible locations or orientations of the stem sections 272 and/or other reference points or locations. However, the first ancillary light emitting device may also be structured or positioned on the lifter mechanism 202 or wheel handler assembly 200 such that, once the first orientation or position indicator 274 is set to be project the first orientation or position indicator 274 on the face 240 of the wheel hub 210 at a selected position or orientation, the position of the first orientation or position indicator 274 may remain relatively the same, even as the position of the wheel handler device 204 and/or rim 238 is adjusted relative to the wheel hub 210. Thus, as shown by FIGS. 11B and 11C, as the position, pitch, roll, and/or yaw of the wheel handler device 204, and thus the rim 238, is adjusted relative to the wheel hub 210 to attain the aligned orientation shown in FIG. 11C, the location of the first orientation or position indicator 274 may remain relatively the same.

Figure 12A:
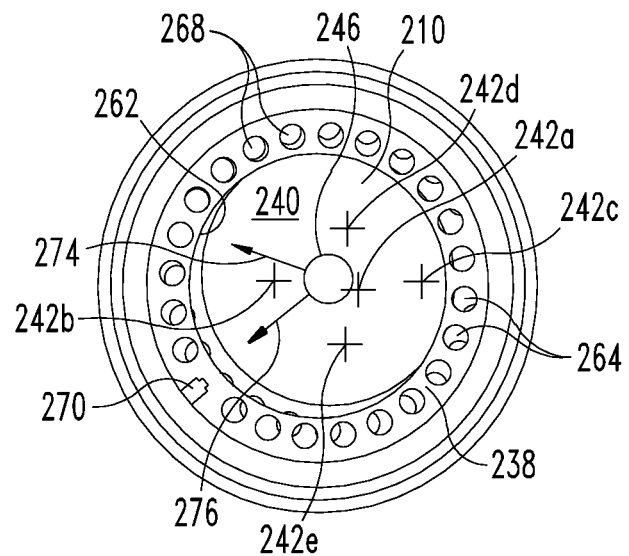
FIGS. 12A-12B illustrate the assembly of a rim to a wheel hub using a wheel handler assembly that includes first and second ancillary light emitting devices that provide first and second orientation or position indicators for identifying the position of a reference item or location on an assembly plate and a rim, respectively.
Figure 12B:
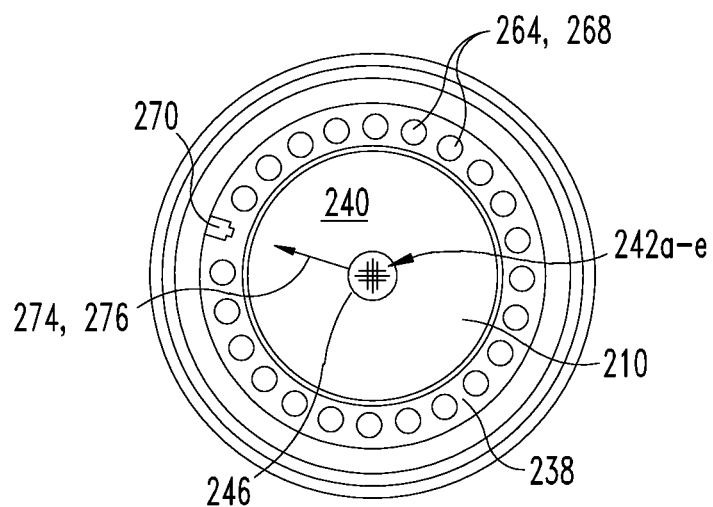

Referencing FIGS. 12A and 12B, according to certain embodiments, the wheel handler assembly 200 may further include at least one second ancillary light emitting device that projects a second orientation or position indicator 276 image of the face 240 of the wheel hub 210, and which may identify a reference location or position on the rim 238. The location of the second orientation or position indicator 276 may be selectively adjustable to accommodate different locations of reference items or other items may be positioned about or relative to the rim 238. For example, the location of the second orientation or position indicator 276 may be adjustable to accommodate the different locations at which the air nozzle or stem 270 of the tire or wheel 206 may be positioned relative to the orientation at which the rim 238 is securely engaged by the wheel handler device 204. However, unlike the first ancillary light emitting device, the second ancillary light emitting device may be adapted to adjust in position based on changes in the orientation or location of the wheel assembly 208. For example, as indicated by FIGS. 12A and 12B, as the roll of at least the wheel handler device 204, and thus the rim 238, is adjusted to at least align the holes of the rim 238 with the apertures 268 of the assembly plate 262, or the air nozzle or stem 270 with the stem section 272, the position of the second orientation or position indicator 276 may also be adjusted. Moreover, as indicated by FIG. 12B, the roll of the rim 238 may be adjusted until the second orientation or position indicator 276 is moved into general alignment with, or converges onto the first orientation or position indicator 274, which may provide a visual indication to the operator of the lifter mechanism 202 that the air nozzle or stem 270 is generally aligned with the stem section 272 of the assembly plate 262.

As shown by FIGS. 6A and 6B, according to certain embodiments, the wheel handler assembly 200 may also include a camera 278 that may detect the light spots 242a-e, 244a-d that are projected onto the face 240 of the wheel hub 210. The camera 278 may be located at variety of locations, including, for example, being positioned on the wheel handler device 204 in the general vicinity of the centrally located light emitting device 236a. Further, according to certain embodiments, video or images captured by the camera of the positions of the light spots 242a-e, 244a-d may be displayed on a display 280, which may be mounted on the wheel handler device 204, the lifter mechanism 202, and/or transmitted to a portable electronic or communication device. Additionally, according to certain embodiments, the camera 278 and/or display 280 may have capabilities to zoom in on the location, or corresponding image, of one or more of the light spots 242a-e, 244a-d. Further, inclusion of the camera 278 may allow for use of light emitting devices 236a-c that provide light beams at a certain wavelength, such as, for example, at an infrared wavelength that is detectable by the camera but not detectable by, or harmful to, the human eye.

The controller 258 may further include multiple processors 282, Arithmetic-Logic Units (ALUs), Central Processing Units (CPUs), Digital Signal Processors (DSPs), or the like that may be dedicated to performance of just the operations described herein or may be utilized in one or more additional applications. In the depicted form, the processing device of the controller 258 is of a programmable variety that executes algorithms and processes data in accordance with operating logic as defined by programming instructions (such as software or firmware) stored in a memory, which may be part of, or connected to, the controller 258. Alternatively or additionally, the operating logic is at least partially defined by hardwired logic or other hardware. The processing device may also include one or more components of any type suitable to process the signals received from the input/output device, such as, for example, a joystick(s) or keypad, or elsewhere, and to provide desired output signals. Such components may include digital circuitry, analog circuitry, or a combination of both.

The controller 258 of the wheel handler assembly 200 may be adapted to process data or images of the light spots 242a-e, 244a-d that are obtained by the camera 278, as well as other information, including positional information provided by distance sensors 256, as previously discussed. Moreover, the controller 258 may be able to derive information relating to the relative positions/orientations of the rim 238 and the wheel hub 210 and/or assembly plate 262 using information the controller 258 derives from the captured video or images, or otherwise obtained from the sensors 256. For example, according to certain embodiments, the controller 258 may derive the differences, if any, in the distances between the first pair of light emitting devices 236b-c and the centrally located light emitting device 236a, and/or the distances between the second pair of light emitting devices and the centrally located light emitting device 236a. The controller 258 may also be adapted to determine the relative pitch angle, roll, and/or yaw, if any, between the wheel handler device 204 or rim 238 and the wheel hub 210. The controller 258 may be further adapted to determine, based on the relative positions, sizes, and/or clarity, of the light spots 242a-e, 224a-d the distance that the rim 238 is separated from the wheel hub 210. Further, according to certain embodiments, the controller 258 may further determine the distance between the rim 238 and the wheel hub 210 based on the distance between one or more of the light spots 242a-e, 224a-d and a reference feature 246 of the wheel hub 210.

The controller 258 may further be adapted to utilize such derived information to provide semi-automatic feedback to the operator of the lifter mechanism 202 as to adjustments that may be made to align the rim 238 with the wheel hub 210. For example, according to certain embodiments, using the derived information, the controller 258 may indicate to the operator of the lifter mechanism 202 the particular control device, such as a joystick, that the operator is to use, and/or the degree of adjustment that is to be attained using the control device, among other guidance. Alternatively, the lifter mechanism 202 may be adapted to automatically adjust the position/orientation of at least the wheel handler device 204 relative to the wheel hub 210 to align the rim 238 with the wheel hub 210.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus for aligning a rim of a wheel assembly to a wheel hub, the apparatus comprising:
a wheel handler device structured to securely engage the wheel assembly;
a light emitting device oriented to emit one or more beams of light onto a face of the wheel hub while the wheel assembly is securely engaged by the wheel handler device;
an adjustment device coupled to the light emitting device, the adjustment device structured to adjust an orientation at which the one or more beams of light is/are emitted from the light emitting device; and
a controller adapted to determine from a location of the one or more beams of light on the face of the wheel hub an orientation of the rim relative to the wheel hub, wherein the wheel handler device is operable for adjusting a position of the wheel assembly relative to a position of the wheel hub based on the location of the one or more beams of light.

2. The apparatus of claim 1, wherein the light emitting device includes:
a centrally located light emitting device oriented to emit a beam of light that is collinear with a central radial axis of the rim of the wheel assembly that is securely engaged by the wheel handler device; and/or
at least one angled light emitting device oriented to emit a beam of light that intersects the beam of light of a centrally located light emitting device at a face of the wheel hub when the central radial axis of the rim is generally aligned with a longitudinal axis of the wheel hub.

3. The apparatus of claim 2, wherein the light emitting device includes at least one angled light emitting device, and the at least one angled light emitting device comprises a first pair of light emitting devices and a second pair of light emitting devices, a first light emitting device of the first and second pairs of light emitting devices being positioned on a side of the centrally located light emitting device that is opposite to a side at which a second light emitting device of the first and second pairs of light emitting devices is positioned.

4. The apparatus of claim 3, wherein one of the first and second light emitting devices of the first pair of light emitting devices is positioned at a location that is to one side of the centrally located light emitting device, and wherein one of the first and second light emitting devices of the second pair of light emitting devices is positioned at a location that is above the centrally located light emitting device.

5. The apparatus of claim 3, wherein the first pair of light emitting devices are oriented to project a first pair of light spots on the face of the wheel hub, and wherein the centrally located light emitting device is oriented to project a central light spot on the face, the difference in the distances between each light spot of the first pair of light spots and the central light spot providing a visual indicator of the presence of yaw angle between the rim and the wheel hub.

6. The apparatus of claim 5, wherein the second pair of light emitting devices are oriented to project a second pair of light spots on the face of the wheel hub, the difference in the distances between each light spot of the second pair of light spots and the central light spot providing a visual indicator of the presence of pitch angle between the rim and the wheel hub.

7. The apparatus of claim 2, wherein the light emitting device emits a beam of light that includes a different appearance, different color, different size, and/or a different shape to that of another beam of light, and wherein the shape is provided by a lens that is operably coupled to the light emitting device.

8. The apparatus of claim 2, wherein the centrally located light emitting device is oriented to project a light spot on a reference feature on the face of the wheel hub when the central radial axis is aligned with a central region of the wheel hub.

9. The apparatus of claim 2, further including:
an optical sensor structured to detect an axial position of the rim relative to the wheel hub and/or a camera positioned to capture one or more images of one or more light spots that are projected onto the face of the wheel hub by the at least one angled light emitting device; and
the controller is adapted to derive from the position of the one or more light spots on the captured one or more images an orientation of the rim relative to the wheel hub.

10. The apparatus of claim 2, further including a first ancillary light emitting device adapted to project a first positional indicator onto the face of the wheel hub, the first ancillary light emitting device further adapted to retain a position of the first positional indicator as a row orientation of the rim relative to the wheel hub is adjusted.

11. The apparatus of claim 10, further including a second ancillary light emitting device adapted to project a second positional indicator on the face of the wheel hub, the second ancillary light emitting device further adapted to adjust a position of the second positional indicator as the row orientation of the rim relative to the wheel hub is adjusted.

12. The apparatus of claim 1, wherein at least one beam of light includes a non-circular pattern of light.

13. An apparatus for aligning a rim of a wheel assembly to a wheel hub, the apparatus comprising:
a wheel handler device structured to securely engage the wheel assembly;
a first light emitting device structured to project a first beam of light onto a face of the wheel hub as a first light spot; and
a second light emitting device structured to project a second beam of light onto the face of the wheel hub as a second light spot, the first and second light emitting devices further adapted to project the first and second light spots onto a reference location on the face of the wheel hub when a central radial axis of the rim of the wheel assembly that is securely engaged by the wheel handler device is generally aligned with a longitudinal axis of the wheel hub, wherein positions of the first and second light spots on the face of the wheel hub indicate an orientation of the rim relative to the wheel hub; and
an adjustment device coupled to at least the first light emitting device, the adjustment device structured to adjust an orientation at which the first beam of light is projected from the first light emitting device.

14. The apparatus of claim 13, wherein differences in distances between the first light spot and the second light spot and the reference location indicates the presence of a yaw or pitch angle between the rim and the wheel hub.

15. The apparatus of claim 14, further including:
a third light emitting device oriented to project a third beam of light in a direction that is generally parallel to the first beam of light and onto the face of the wheel hub as a third light spot; and a fourth light emitting device oriented to project a fourth beam of light in a direction that is generally parallel to the first beam of light and onto the face of the wheel hub as a fourth light spot, and
wherein the third and fourth light emitting devices are also oriented to project the third and fourth light spots onto a reference location on the face of the wheel hub when the central radial axis of the rim of the wheel assembly that is securely engaged by the wheel handler device is generally aligned with the longitudinal axis of the wheel hub.

16. The apparatus of claim 15, wherein differences in distances between the first light spot and the second light spot and the reference location indicates the presence of a yaw angle between the rim and the wheel hub, and differences in distances between the third light spot and the fourth light spot and the reference location indicates the presence of a pitch angle between the rim and the wheel hub.

17. The apparatus of claim 13, further including:
an optical sensor and/or a camera positioned to detect one or more images of the rim, the wheel hub, the first light spot and second light spot; and
a controller adapted to determine from the positions of the first and second light spots the orientation of the rim relative to the wheel hub.

18. The apparatus of claim 17, wherein the first and second light emitting devices are structured to emit the first and second light beams at a wavelength in which the projected first and second light spots on the face of the wheel hub are not visually detectable to an operator of the wheel handler device without use at least one of the optical sensor and camera.

19. The apparatus of claim 13, wherein at least one of the beams of light includes a different appearance, different color, different size, and/or a different shape to that of another beam of light, and wherein the shape is defined by a lens that is coupled to one of the light emitting devices.

20. An apparatus for aligning a rim of a wheel assembly to a wheel hub, the apparatus comprising:
a wheel handler device structured to securely engage the wheel assembly;
a first light emitting device structured to project a first beam of light onto a face of the wheel hub as a first light spot;
a second light emitting device structured to project a second beam of light onto the face of the wheel hub as a second light spot, the first and second light emitting devices further adapted to project the first and second light spots onto a reference location on the face of the wheel hub when a central radial axis of the rim of the wheel assembly that is securely engaged by the wheel handler device is generally aligned with a longitudinal axis of the wheel hub;
a first ancillary light emitting device adapted to project a first positional indicator on the face of the wheel hub, the first ancillary light emitting device further adapted to retain a position of the first positional indicator as a row orientation of the rim relative to the wheel hub is adjusted; and
a second ancillary light emitting device adapted to project a second positional indicator on the face of the wheel hub, the second ancillary light emitting device further adapted to adjust a position of the second positional indicator as the row orientation of the rim relative to the wheel hub is adjusted.

* * * * *